(12) United States Patent
Tabuchi et al.

(10) Patent No.: US 12,431,769 B2
(45) Date of Patent: Sep. 30, 2025

(54) CONTROL DEVICE FOR ROTARY ELECTRIC MACHINE UNIT

(71) Applicant: TOYOTA JIDOSHA KABUSHIKI KAISHA, Toyota (JP)

(72) Inventors: Kenta Tabuchi, Toyota (JP); Yoshitomo Kawanishi, Toyota (JP); Shingo Nagai, Toyota (JP); Sho Okazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 18/460,778

(22) Filed: Sep. 5, 2023

(65) Prior Publication Data

US 2024/0154502 A1 May 9, 2024

(30) Foreign Application Priority Data

Nov. 4, 2022 (JP) .................................. 2022-177464
Feb. 15, 2023 (JP) .................................. 2023-021629

(51) Int. Cl.
*H02K 11/30* (2016.01)
*F02N 11/00* (2006.01)
(Continued)

(52) U.S. Cl.
CPC ............ *H02K 11/30* (2016.01); *F02N 11/003* (2013.01); *H02K 3/32* (2013.01); *H02K 11/25* (2016.01); *F02N 2200/14* (2013.01)

(58) Field of Classification Search
CPC ........ H02K 11/00; H02K 11/25; H02K 11/30; H02K 9/00; H02K 9/005; H02K 9/19;
(Continued)

(56) References Cited

U.S. PATENT DOCUMENTS 6,355,995 B1 * 3/2002 Jeppesen .................. H02K 9/12
310/58
7,545,060 B2 * 6/2009 Ward ..................... H02K 9/197
310/260

(Continued)

FOREIGN PATENT DOCUMENTS

| JP | 2012-151995 A | 8/2012 |
| JP | 2014-64386 A | 4/2014 |
| JP | 2019-161948 A | 9/2019 |

*Primary Examiner* — Tran N Nguyen
(74) *Attorney, Agent, or Firm* — Oblon, McClelland, Maier & Neustadt, L.L.P.

(57) ABSTRACT

A control device includes an information acquisition unit configured to acquire information related to an air density in a coil and information related to a voltage applied to a rotary electric machine, an insulation determination unit configured to determine whether or not dielectric breakdown occurs in the coil based on the information related to the air density and the information related to the voltage acquired by the information acquisition unit, and configured to determine whether or not an insulation state of the coil is needed to be maintained by supplying an oil to the coil, and a drive instruction unit configured to drive an oil supply unit, when the insulation determination unit determines that dielectric breakdown occurs in the coil and determines that the insulation state of the coil is needed to be maintained by supplying the oil to the coil.

6 Claims, 11 Drawing Sheets

(51) Int. Cl.
*H02K 3/32* (2006.01)
*H02K 9/19* (2006.01)
*H02K 11/25* (2016.01)

(58) Field of Classification Search
CPC ............ H02K 9/197; H02K 3/00; H02K 3/12;
H02K 3/24; H02K 3/32; F02N 11/00;
F02N 11/003; F02N 2200/14; B60L 3/00;
B60K 6/00; B60K 6/26; B60K 6/44;
B60K 6/445; B60K 11/00; B60K 11/02;
B60K 11/30
See application file for complete search history.

(56) References Cited

U.S. PATENT DOCUMENTS

| | | | |
|---|---|---|---|
| 8,169,110 B2 * | 5/2012 | Swales | H02K 11/05 |
| | | | 310/58 |
| 2011/0181136 A1 * | 7/2011 | Nakamori | H02K 3/24 |
| | | | 310/54 |

* cited by examiner

OIL PUMP OPERATION MAP

CONTROL DEVICE FOR ROTARY ELECTRIC MACHINE UNIT

CROSS-REFERENCE TO RELATED APPLICATION

This application is based upon and claims the benefit of priority of the prior Japanese Patent Application No. 2023-021629, filed on Feb. 15, 2023, and Japanese Patent Application No. 2022-177464, filed on Nov. 4, 2022, the entire contents of which are incorporated herein by reference.

TECHNICAL FIELD

The present disclosure relates to a control device for a rotary electric machine unit.

BACKGROUND

Conventionally, oil is supplied to coils included in a motor as a rotary electric machine by using an oil pump (see, for example, Japanese Unexamined Patent Application Publication No. 2019-161948). Further, it has been proposed to supply oil as an insulating material in a coil (see, for example, Japanese Unexamined Patent Application Publication No. 2012-151995). The oil is supplied by an electric oil pump or a mechanical oil pump.

When the oil pump is of an electric type, the operation of the oil pump consumes electric power, and the driving loss associated with the driving of the pump is generated, resulting in deterioration of electric power consumption. In addition, when the oil pump is of a mechanical type, a driving loss occurs due to the driving of the pump. For this reason, it is desirable that the operation frequency of the oil pump is low in order to improve the electricity consumption and reduce the driving loss accompanying the driving of the pump. However, in Japanese Unexamined Patent Application Publication No. 2012-151995, there is room for improvement in ensuring insulation properties while reducing the loss accompanying the driving of the pump.

SUMMARY

It is therefore an object of the present disclosure to provide a control device, for a rotary electric machine unit, capable of efficiently driving an oil pump and ensuring insulation in a coil included in the rotary electric machine.

The above object is achieved by a control device for a rotary electric machine unit including: a rotary electric machine; and an oil supply unit including an oil pump that supplies oil to a coil included in the rotary electric machine, the control device including: an information acquisition unit configured to acquire information related to an air density in the coil and information related to a voltage applied to the rotary electric machine; an insulation determination unit configured to determine whether or not dielectric breakdown occurs in the coil based on the information related to the air density and the information related to the voltage acquired by the information acquisition unit, and configured to determine whether or not an insulation state of the coil is needed to be maintained by supplying the oil to the coil; and a drive instruction unit configured to drive the oil supply unit, when the insulation determination unit determines that dielectric breakdown occurs in the coil and determines that the insulation state of the coil is needed to be maintained by supplying the oil to the coil.

The information acquisition unit may be configured to acquire information related to an air temperature in the coil and information related to an atmospheric pressure, as the information related to the air density.

The information acquisition unit may be configured to acquire a detection value of a temperature of the coil or a detection value of a temperature of the oil, as the information related to the air temperature in the coil.

The information acquisition unit may be configured to acquire a detection value of an atmospheric pressure sensor or altitude information acquired by a position information acquisition device included in a vehicle on which the rotary electric machine is mounted, as the information related to the atmospheric pressure.

The oil pump may be a mechanical pump that is driven by operation of an internal combustion engine, the drive instruction unit may be configured to drive the rotary electric machine to start the internal combustion engine, when the insulation determination unit determines that dielectric breakdown occurs in the coil and determines that the insulation state of the coil is needed to be maintained by supplying the oil to the coil, the control device may further include an application voltage limitation unit, and the application voltage limitation unit may be configured to limit the voltage applied to the rotary electric machine, when the rotary electric machine is driven to start the internal combustion engine in accordance with an instruction from the drive instruction unit.

Also, the above object is achieved by a control device for a rotary electric machine unit including: a rotary electric machine; and an oil supply unit including a gear mechanism that is driven by the rotary electric machine, at least a part of the gear mechanism being immersed in oil, the oil supply unit supplying the oil to a coil included in the rotary electric machine by operating the gear mechanism, the control device comprising: an information acquisition unit configured to acquire information related to an air density in the coil and information related to a voltage applied to the rotary electric machine; an insulation determination unit configured to determine whether or not dielectric breakdown occurs in the coil based on the information related to the air density and the information related to the voltage acquired by the information acquisition unit, and configured to determine whether or not an insulation state of the coil is needed to be maintained by supplying the oil to the coil; a drive instruction unit configured to drive the oil supply unit, when the insulation determination unit determines that dielectric breakdown occurs in the coil and determines that the insulation state of the coil is needed to be maintained by supplying the oil to the coil; and an application voltage limitation unit configured to limit the voltage applied to the rotary electric machine, when the rotary electric machine is driven in accordance with an instruction from the drive instruction unit.

DETAILED DESCRIPTION

Figure 1:
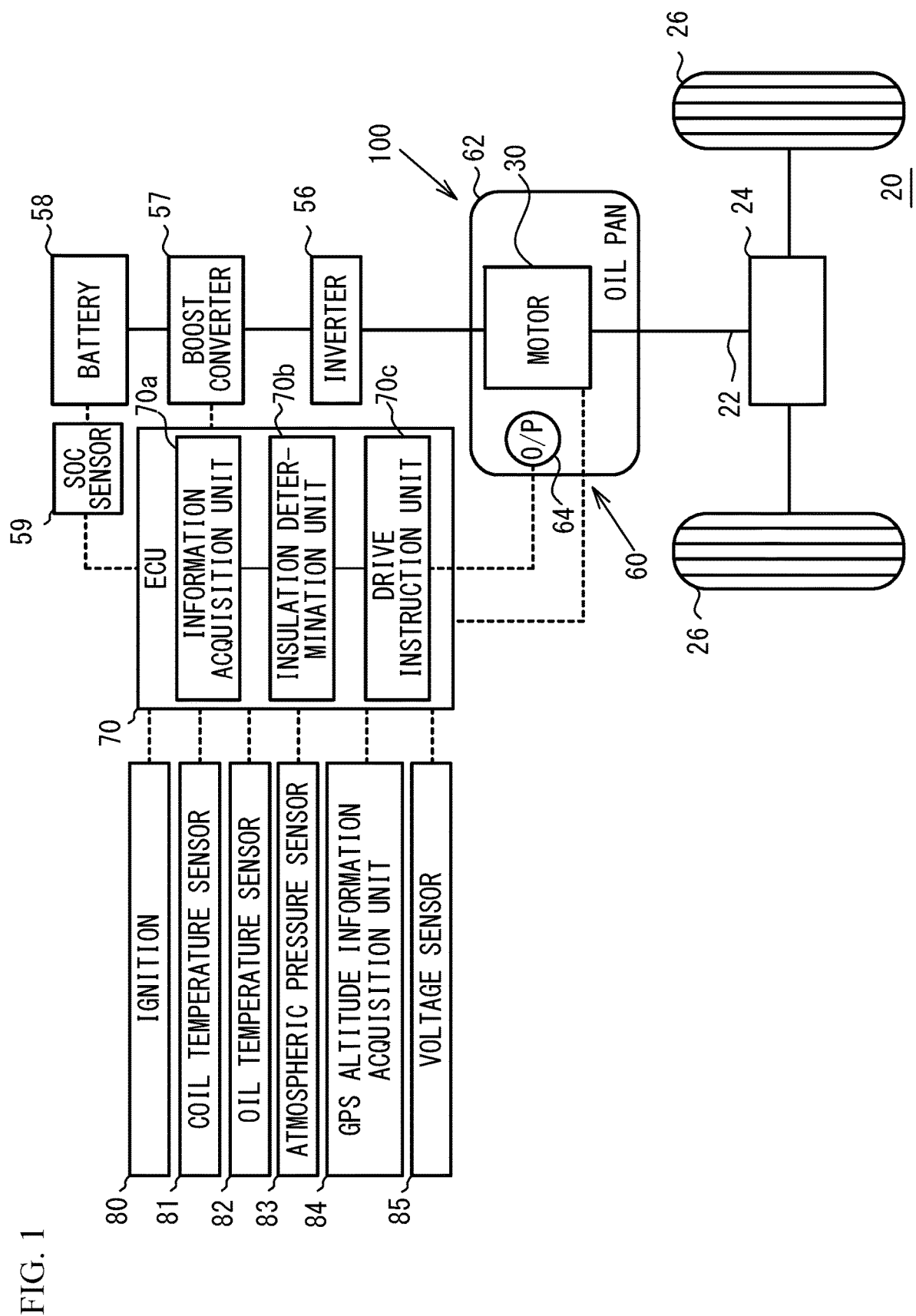
FIG. 1 is a configuration view schematically illustrating an outline of a vehicle on which a rotary electric machine unit according to a first embodiment is mounted.

Hereinafter, embodiments of the present disclosure will be described with reference to the accompanying drawings. However, in the drawings, the dimensions, ratios, and the like of each part may not be illustrated so as to completely match the actual ones. Further, details may be omitted in some drawings.

First Embodiment

[Vehicle]

First, a vehicle 20 on which a rotary electric machine unit 100 according to a first embodiment is mounted will be described with reference to FIG. 1. The rotary electric machine unit 100 includes a motor 30, which is an example of a rotary electric machine, and an oil supply unit 60 that supplies oil to coils 44 (see FIG. 2) included in the motor 30. The vehicle 20 includes an electronic control unit (ECU) 70 that executes various types of control of the vehicle 20.

The vehicle 20 is an electric vehicle. The vehicle 20 includes a battery 58 that is a chargeable and dischargeable secondary battery, a boost converter 57 that boosts a DC voltage of the battery, and an inverter 56. The inverter 56 switches the DC power supply boosted by the boost converter 57 with a switching element to convert the DC power supply into three phase AC power. The three phase AC power converted by the inverter 56 is supplied to the motor 30. An output shaft 22 of the motor 30 is transmitted to driving wheels 26 via a differential gear 24 so that the vehicle 20 can travel. The vehicle 20 of the present embodiment is an electric vehicle, but may be a hybrid vehicle provided with an engine as long as the motor 30 is used as a drive source. The motor 30 not only generates a driving force of the vehicle 20 in accordance with power supplied from the battery 58, but also generates electric power by power transmitted from the driving wheels 26 of the vehicle 20 and can function as a motor generator that charges the battery 58.

<Configuration of Rotary Electric Machine Unit>

Here, the configuration of the rotary electric machine unit 100 will be described in detail.

<<Configuration of Motor>>

Figure 2:
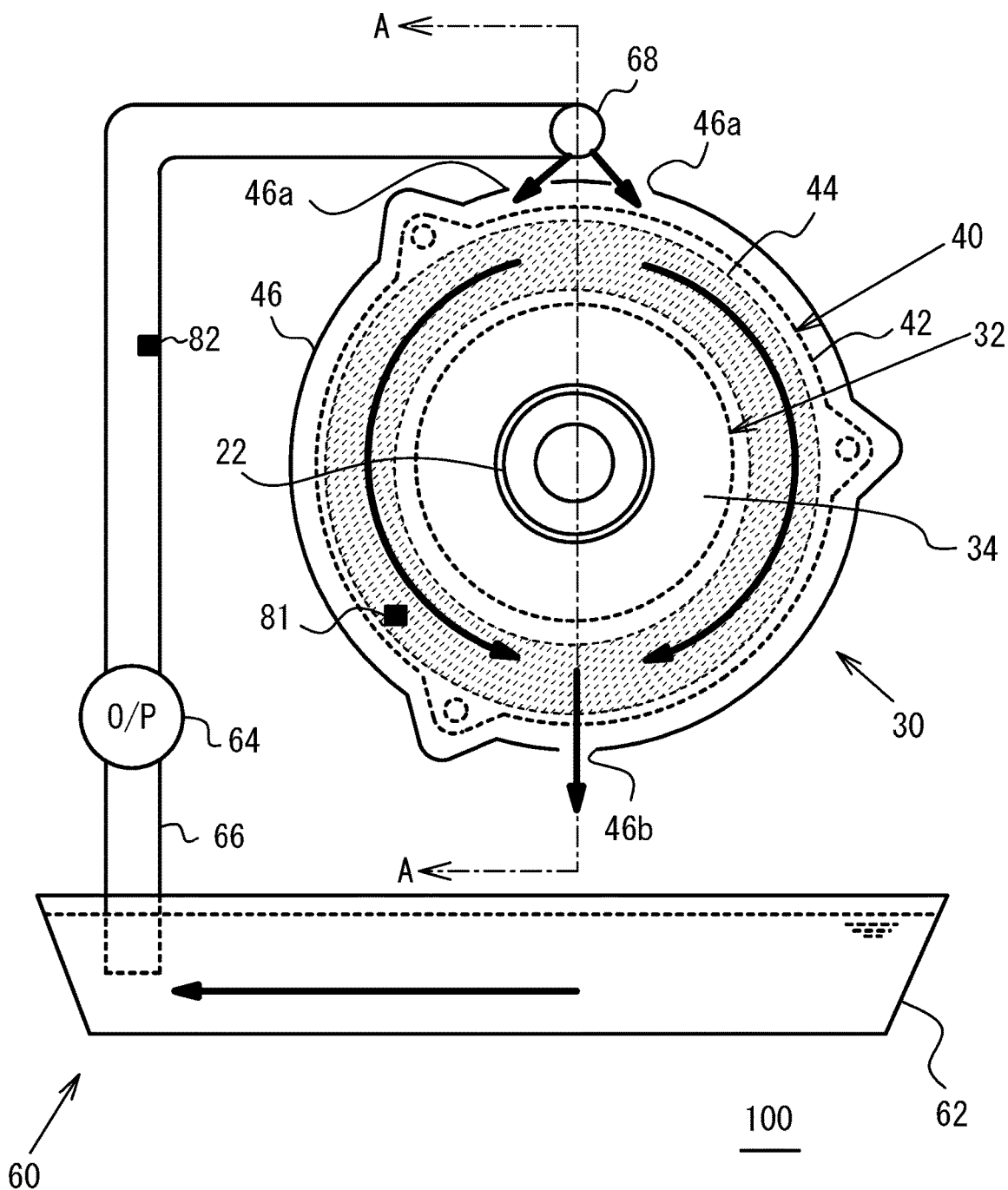
FIG. 2 is an explanatory view illustrating an outline of the rotary electric machine unit according to the first embodiment.
Figure 3:
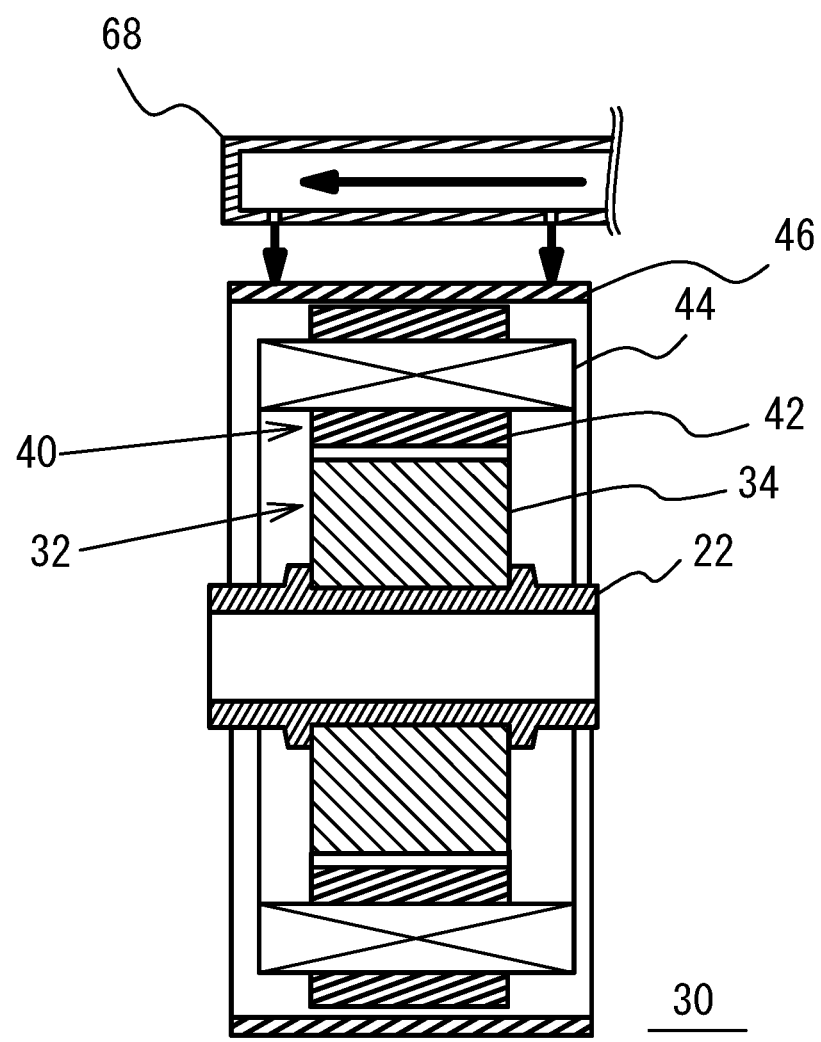
FIG. 3 is a cross-sectional view of the rotating electrical machine unit according to the first embodiment taken along line A-A in FIG. 2.

First, the motor 30 will be described with reference to FIGS. 2 and 3. The motor 30 includes a rotor 32 and a stator 40 housed in a case 46.

The stator 40 includes a stator core 42 that is a substantially cylindrical magnetic component. The stator core 42 is formed by, for example, stacking magnetic plates such as electromagnetic steel plates in the axial direction. In the stator core 42, the coils 44 are formed by arranging a plurality of segment conductors. The coils 44 include a three phase coil, that is, a U-phase coil, a V-phase coil, and a W-phase coil. Note that the coils 44 may be wound around the teeth of the stator core 42 by concentrated winding.

The rotor 32 includes a rotor core 34 disposed radially inward of the stator 40 so as to be concentric with the stator 40 and face the stator 40. The output shaft 22, which is a rotating shaft member, is provided at a central portion of the rotor core 34. The output shaft 22 is supported by a bearing portion provided in the case 46 and a lid portion (not illustrated). The rotor core 34 may be equipped with permanent magnets.

An oil supplying port 46a into which oil to be supplied to the coils 44 by the oil supply unit 60 described later is introduced is provided in an upper portion of the case 46. An oil discharging port 46b through which the oil supplied into the case 46 is discharged is provided in a lower portion of the case 46.

<<Configuration of Oil Supply Unit>>

Next, the oil supply unit 60 will be described. The oil supply unit 60 includes an oil pan 62 provided below the motor 30, an oil supply pipe 66 provided with an oil pump 64, and an oil shower pipe 68 connected to the oil supply pipe 66. In FIGS. 2 and 3, arrows indicate the flow of oil and the injected oil.

The oil is stored in the oil pan 62. A lower end portion of the oil supply pipe 66 is disposed in the oil pan 62. When the oil pump 64 operates, the oil in the oil pan 62 is sucked up. The oil supply pipe 66 is provided with an oil temperature sensor 82 to be described later. A heat exchanger for cooling oil may be provided on the downstream side of the oil temperature sensor 82 of the oil supply unit 60.

The oil shower pipe 68 is disposed above the motor 30. The oil shower pipe 68 is connected to the oil supply pipe 66, and injects the oil pumped up by the oil pump 64 toward the motor 30. The oil injected from the oil shower pipe 68 is introduced into the case 46 through the oil supplying port 46a. The oil introduced into the case 46 is supplied to the coils 44 housed in the case 46. The oil cools the coils 44 and functions as an insulating material in the coils 44 to improve the insulation resistance of the coils 44.

The oil pumps 64 in the present embodiment are of an electric type and are driven based on a drive instruction by a drive instruction unit 70c (see FIG. 1) described later.

<Configuration of Control Unit>

Next, the ECU 70 will be described. The ECU 70 includes a central process unit (CPU), a random access memory (RAM), a read only memory (ROM), a storage device, and the like. The ECU 70 controls the vehicles 20 by executing a program stored in the ROM or the storage device. The ECU 70 is electrically connected to an ignition 80, a coil temperature sensor 81, the oil temperature sensor 82, and an atmospheric pressure sensor 83. Also, the ECU 70 is electrically connected to a Global Positioning System (GPS) altitude information acquisition unit 84 and a voltage sensor 85. The ECU 70 is further electrically connected to a State Of Charge (SOC) sensor 59 connected to the battery 58. In addition to these, various sensors for controlling the vehicles 20 are electrically connected to the ECU 70, but detailed description thereof is omitted here.

The ignition 80 is a switch for setting the vehicle 20 to a state in which traveling is possible. The coil temperature sensor 81 is installed in the vicinity of the coils 44 and detects the temperature of the coils 44. The oil temperature sensor 82 detects the temperature of the oil supplied to the coils 44. The atmospheric pressure sensor 83 detects an atmospheric pressure of an environment in which the vehicle 20 is located. The GPS altitude information acquisition unit 84 extracts altitude information from position information detected by a position information detection unit included in a car navigation system (position information acquisition device). The voltage sensor 85 detects the voltage boosted by the boost converter 57. The SOC sensor 59 detects a remaining capacity SOC of the battery 58.

The ECU 70 determines whether or not the motor 30 is placed in an environment requiring supply of oil as an insulating material. When the supply of oil is required, the ECU 70 controls to drive the oil pumps 64 to supply oil to the coils 44. In order to execute such control, the ECU 70 functions as an information acquisition unit 70a, an insulation determination unit 70b, and the drive instruction unit 70c.

The insulation determination unit 70b determines whether or not dielectric breakdown, that is, short-circuit occurs in the coils 44. Here, the determination of whether or not the dielectric breakdown occurs includes not only the case where the dielectric breakdown actually occurs but also the case where the dielectric breakdown may occur. Whether or not the dielectric breakdown occurs is determined by setting a threshold value through an experiment, a simulation, or the like. The information acquisition unit 70a acquires various kinds of information for the insulation determination unit 70b to determine the insulation properties of the coils 44. The drive instruction unit 70c drives the oil pumps 64, when the insulation determination unit 70b determines that oil needs to be supplied to the coils 44.

Here, information for determining the insulation properties of the coils 44 will be described. The insulation properties of the coils 44 are influenced by the air density inside the coils 44, that is, between wires such as the segment conductors and the windings forming the coils 44, and the voltage applied to the coils 44. Specifically, when the air density decreases and the voltage applied to the coils 44 increases, the insulation properties decreases. Therefore, in the present embodiment, information related to the air density and information related to the voltage (motor application voltage) applied to the motor 30 (coils 44) are acquired, and the insulation properties is determined based on these pieces of information.

The air density is influenced by air temperature and atmospheric pressure. Therefore, in the present embodiment, in order to consider the influence of the air density, the information acquisition unit 70a acquires the information of the air temperature and the information of the atmospheric pressure.

It is difficult to directly detect the air temperature in the coils 44. Therefore, in the present embodiment, the coil temperature correlated with the air temperature is detected and used as the air temperature. The coil temperature is detected by the coil temperature sensor 81. As the value correlated with the air temperature, the oil temperature detected by the oil temperature sensor 82 may be acquired as information. Further, in the vehicle 20, a thermal network is formed in which heat is exchanged at various locations. Therefore, the temperature estimated based on the transfer of heat in the thermal network may be used as information of a value having correlation with the air temperature.

The atmospheric pressure is detected by the atmospheric pressure sensor 83 provided in the vehicle 20. In a vehicle equipped with a navigation system like the vehicle 20 according to the present embodiment, the atmospheric pressure estimated based on the altitude information extracted from the position information detected by the position information detection device may be used as the information.

The voltage applied to the motor 30 is detected by the voltage sensor 85 that detects the voltage boosted by the boost converter 57. As long as the voltage applied to the motor 30 is evaluated, a voltage at another location in the vehicle 20 may be used as the information. For example, a voltage that can be applied to the motor 30 may be estimated based on the state of charge of the battery 58 detected by the SOC sensor 59, and this value may be used as the information. If the vehicle does not include a boosting system such as the boost converter 57, the voltage of the battery 58 may be used as the information. In addition, in the vehicle 20, a surge voltage may occur due to various causes. Therefore, when occurrence of a surge voltage is predicted, the predicted surge voltage may be used as the information. Thus, the motor 30 is protected.

[Oil Supply Control]

Figure 4:
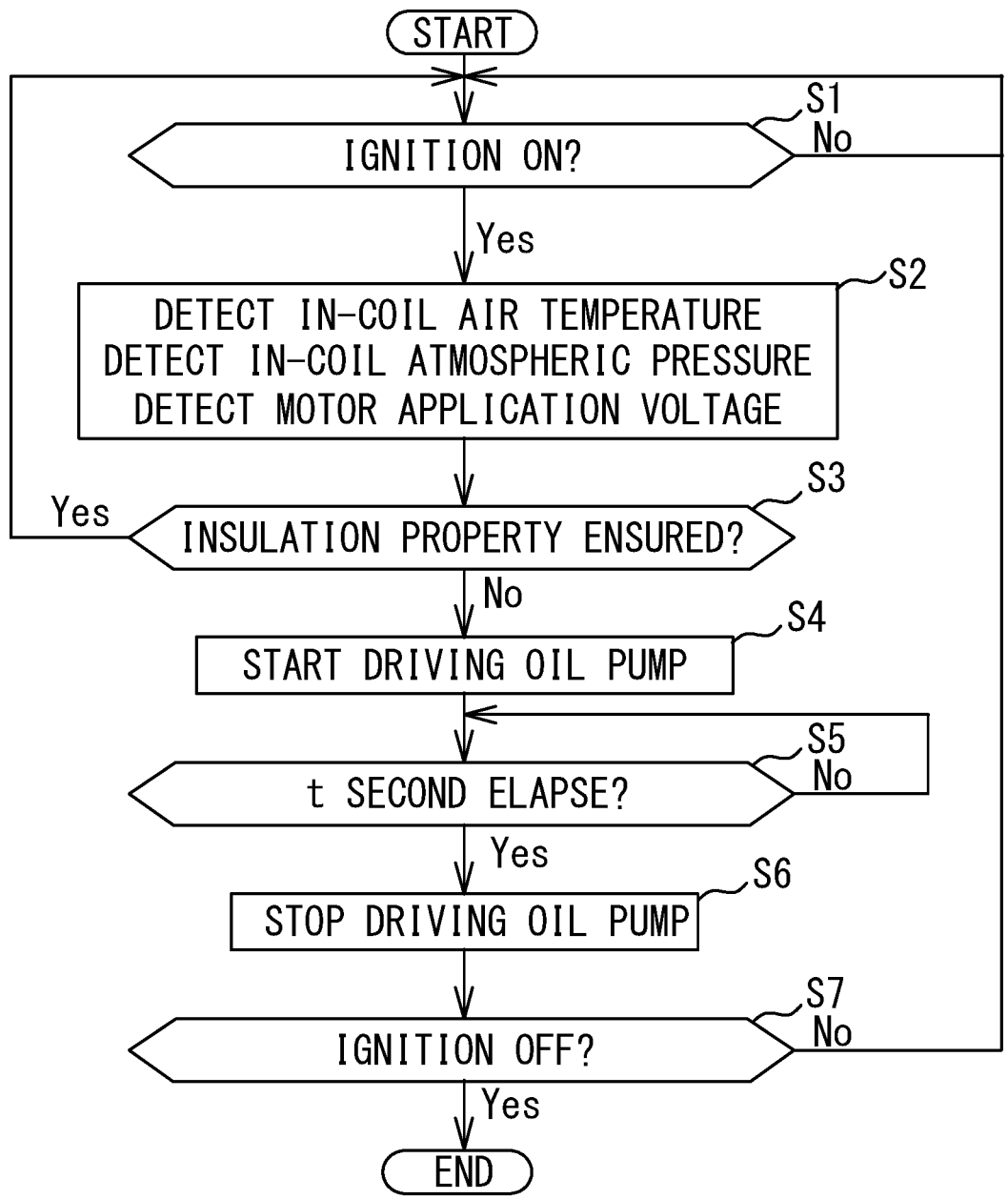
FIG. 4 is a flowchart illustrating an example of control executed by the control device for the rotary electric machine unit according to the first embodiment.
Figure 5:
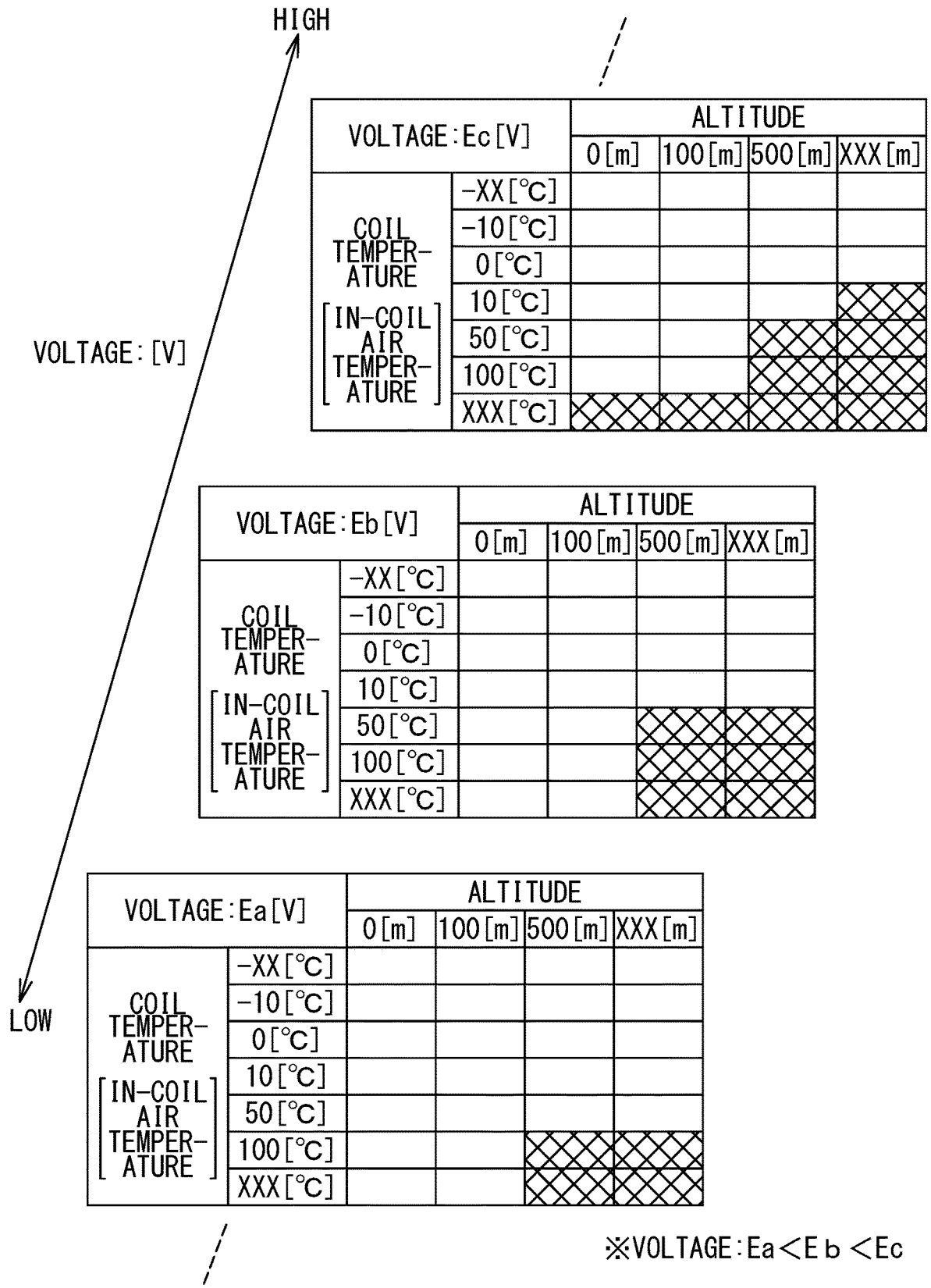
FIG. 5 is a view illustrating an example of an oil pump operation map in the control device for the rotary electric machine unit according to the first embodiment.

Next, an example of oil supply control will be described with reference to FIGS. 1, 4, and 5.

In step S1, the ECU 70 determines whether or not the ignition 80 is turned on. When a positive determination (Yes determination) is made in step S1, the ECU 70 proceeds to step S2. On the other hand, when a negative determination (No determination) is made in step S1, the ECU 70 repeats the process of step S1 until an affirmative determination is made in step S1.

In step S2, the ECU 70, concretely, the information acquisition unit 70a acquires various kinds of information for determining whether or not the insulation properties in the coils 44 (see FIG. 2) is ensured. That is, the information acquisition unit 70a acquires the coil temperature as an in-coil air temperature from the coil temperature sensor 81, and acquires the atmospheric pressure as an in-coil atmospheric pressure from the atmospheric pressure sensor 83. In addition, the information acquisition unit 70a acquires the voltage boosted by the boost converter 57 from the voltage sensor 85 as the motor application voltage.

In step S3 executed subsequent to step 2, the insulation determination unit 70b determines the insulation properties of the coils 44. The insulation determination unit 70b executes isolation determination based on the oil-pump operation map illustrated in FIG. 5. When a negative determination is made in step S3, that is, when it is determined that the insulation properties of the coils 44 is not ensured, the process proceeds to step S4. In step S4, the drive instruction unit 70c instructs the oil pump 64 to drive. On the other hand, when the insulation determination unit 70b makes an affirmative determination in step S3, the ECU 70 repeats the processes from step S1.

Here, the oil pump operation map illustrated in FIG. 5 will be described. The oil pump operation map includes three parameters of a motor application voltage (indicated as "voltage" in the map) applied to the motor 30, a coil temperature, and an altitude. Specifically, the insulation properties is determined by a combination of the coil temperature and the altitude set for each voltage. Based on the result, it is determined whether or not to operate the oil pump

64. In FIG. 5, a hatched portion indicates a state where insulation is not ensured and the oil pump 64 is determined to be operated.

The higher the value of the motor application voltage is, the more difficult it is to ensure insulation. In addition, as the coil temperature (in-coil air temperature) is higher and the altitude is higher, the air density is lower and it is more difficult to ensure the insulation properties. Therefore, in the oil pump operation map, the higher the motor application voltage is, the more frequently the motor 30 is operated. That is, even if the coil temperature and the altitude are substantially equal to each other, the higher the motor application voltage, the higher the frequency at which the motor is operated. Therefore, even when the coil temperature is low and the altitude is low, that is, even when the air density is high, the frequency of operating the motor 30 is high. Further, even if the motor application voltage and the altitude are substantially equal to each other, the higher the coil temperature is, the higher the frequency of operating the motor 30 is. Further, even if the voltage applied to the motor and the coil temperature are substantially equal to each other, the higher the altitude, the higher the frequency of operating the motor 30.

When the insulation determination unit 70b makes a negative determination in step S3, the process proceeds to step S4 to start driving of the oil pump 64. Then, in step S5, the ECU 70 determines whether or not t seconds have elapsed from the start of driving of the oil pumps 64. This t seconds is a time set in advance by an experiment or a simulation as an oil supply time during which the oil pump 64 is operated to improve the insulation resistance of the coils 44. When an affirmative determination is made in step S5, the ECU7 proceeds to step S6 to stop driving of the oil pump 64. On the other hand, when a negative determination is made in step S5, the ECU 70 repeats the process of step S5 until an affirmative determination is made in step S5, and continues to drive the oil pumps 64.

In step S7 executed subsequent to step S6, the ECU 70 determines whether or not the ignition 80 is turned off. When a negative determination is made in step S7, the ECU 70 repeats the processes from step S1. Thus, when the ignition 80 is in the ON state, the oil supply control is continued. On the other hand, when an affirmative determination is made in step S7, the ECU 70 ends the series of processes (END).

As described above, according to the present embodiment, when the insulation determination unit 70b determines that oil needs to be supplied to the coils 44, the oil pumps 64 are driven to supply oil to the coil. In this way, the oil pump 64 is driven based on the isolation determination by the insulation determination unit 70b. Therefore, the operation frequency of the oil pump is suppressed. In addition, insulation resistance of the coils 44 is improved, and insulation properties of the coils 44 are ensured.

Second Embodiment

[Rotary Electric Machine Unit in Hybrid Vehicle]

Figure 6:
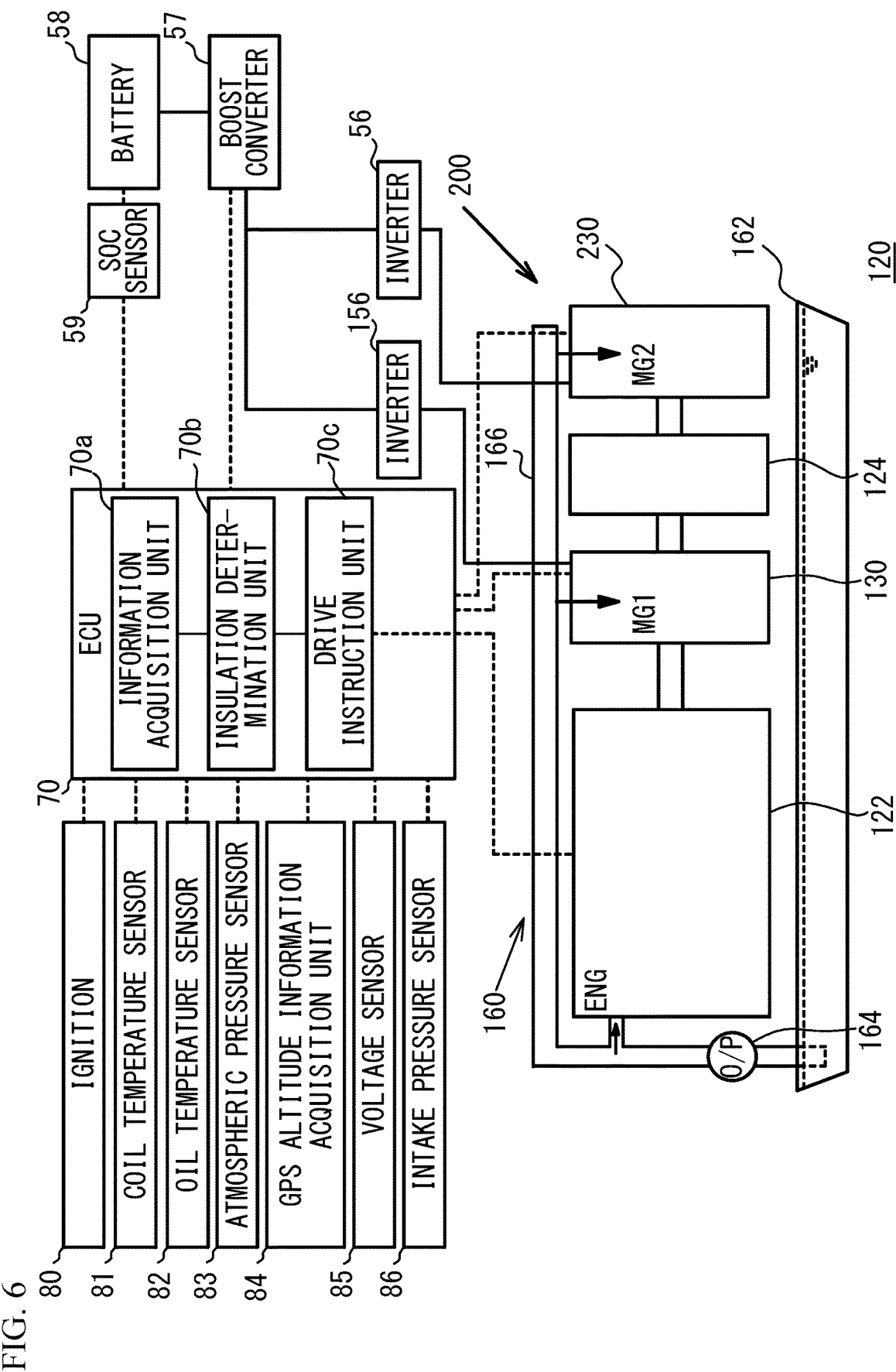
FIG. 6 is a configuration view schematically illustrating an outline of a main part of a vehicle on which a rotary electric machine unit according to a second embodiment is mounted.

Next, a second embodiment will be described with reference to FIG. 6. A vehicle 120 according to the second embodiment is a hybrid vehicle including an engine 122. That is, the second embodiment is an embodiment in which a rotary electrical machine unit 200 is provided in the vehicle 120 that is a hybrid vehicle. Components common to the first embodiment are denoted by the same reference numerals in the drawings, and a detailed description thereof is omitted.

The vehicle 120 includes the engine 122, a first motor generator 130, a second motor generator 230, and a power split device 124. Outputs from the engine 122 is split by the power split device 124, which is a planetary gear mechanism, into power for driving the vehicle and power used for power generation. The first motor generator 130 normally functions as a generator. The second motor generator 230 normally functions as a motor. The power from the engine 122 rotates drive wheels (not illustrated) together with the outputs from the second motor generator 230 to drive the vehicle 120. The boost converter 57 boosts DC power of the battery 58 which is a chargeable and dischargeable secondary battery. The boosted DC current is converted into three phase AC power by the inverter 56. The second motor generator 230 is a synchronous motor driven by the converted three phase AC power. The three phase AC power generated by the first motor generator 130 is converted into DC power by an inverter 156 and stored in the battery 58.

Each of the first motor generator 130 and the second motor generator 230 corresponds to a rotary electric machine. The configurations of the first motor generator 130 and the second motor generator 230 are substantially the same as those of the motor 30 in the first embodiment.

The vehicle 120 includes an oil supply unit 160 instead of the oil supply unit 60 included in the vehicle 20 according to the first embodiment. The oil supply unit 160 includes an oil pan 162 provided below the engine 122, the first motor generator 130, the power split device 124 and the second motor generator 230, and an oil supply pipe 166 in which an oil pump 164 is disposed. Although not illustrated in FIG. 6, the oil supply unit 160 includes an oil shower pipe connected to the oil supply pipe 166. The oil shower pipe supplies oil to the first motor generator 130 and the second motor generator 230.

Unlike the oil pump 64 in the first embodiment, the oil pump 164 is a mechanical pump driven by the rotation of the engine 122. The oil pump 164 is rotationally driven by a camshaft (not illustrated) included in the engine 122.

Also in such the vehicle 120, the oil supply control is executed similarly to the first embodiment. That is, the control based on the flowchart illustrated in FIG. 4 can also be applied to the second embodiment. However, the oil pump 164 in the present embodiment is of a mechanical type. Therefore, in step S4 in the flowchart illustrated in FIG. 4, the engine 122 is started. In other words, the ECU 70 starts the engine 122 and rotates a cam shaft included in the engine 122, thereby driving the oil pumps 164.

As a result, similarly to the first embodiment, insulation resistance in the first motor generator 130 and the second motor generator 230 is improved.

Also in the second embodiment, the driving of the oil pumps 164 is executed based on the insulation determination by the insulation determination unit 70b. Therefore, the operation frequency of the oil pumps is suppressed.

In a case where the engine 122 includes an intake pressure sensor 86, the atmospheric pressure may be estimated based on a detection value of the intake pressure sensor 86, and the estimated value may be used to determine the insulation properties of the coils.

Third Embodiment

Figure 7:
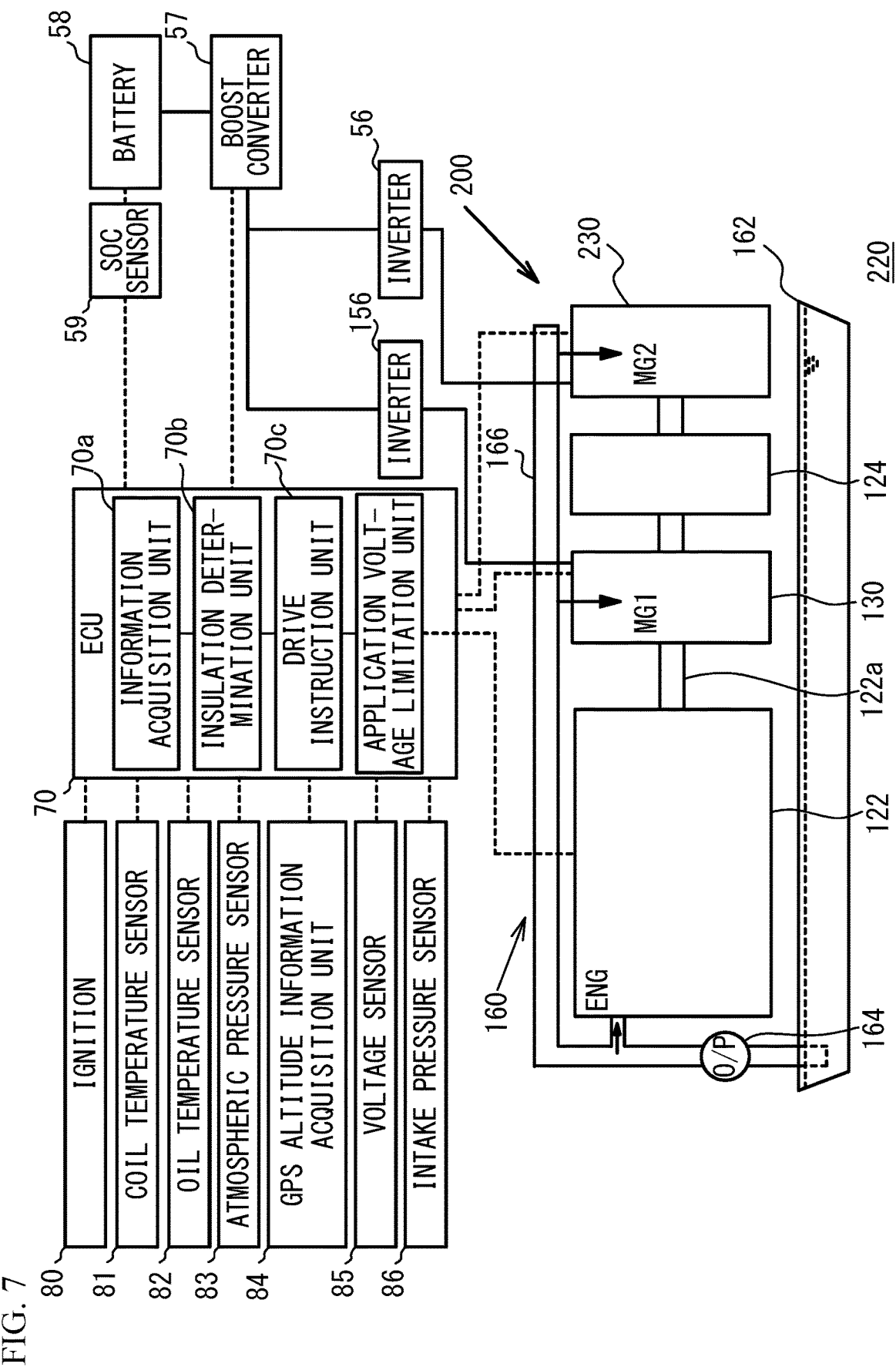
FIG. 7 is a configuration view schematically illustrating an outline of a vehicle on which a rotary electric machine unit according to a third embodiment is mounted.

Next, a third embodiment will be described with reference to FIGS. 7 to 9. A hardware configuration of a vehicle 220 according to the third embodiment is the same as that of the vehicle 120 according to the second embodiment. However, it differs from the second embodiment in that the ECU 70 functions as an application voltage limitation unit 70*d* in addition to the information acquisition unit 70*a*, the insulation determination unit 70*b*, and the drive instruction unit 70*c*. Components common to the second embodiment are given the same reference numerals as in the second embodiment. A detailed description of components common to the second embodiment is omitted.

An output shaft 122*a* of the engine 122 included in the vehicle 220 is connected to the first motor generator 130 corresponding to a rotary electric machine. The engine 122 is started by driving the first motor generator 130.

The first motor generator 130 is driven based on an instruction of the drive instruction unit 70*c* to start the engine 122. At this time, the application voltage limitation unit 70*d* limits the voltage applied to the first motor generator 130.

The drive instruction unit 70*c* starts driving the oil pump 164 of a mechanical type by starting the engine 122 when there is a possibility of occurrence of dielectric breakdown in the first motor generator 130. At this time, if the first motor generator 130 is driven without limiting the application voltage, there is a possibility that dielectric breakdown occurs in the first motor generator 130. Therefore, the application voltage limitation unit 70*d* limits the voltage applied to the first motor generator 130.

Here, an example of the oil supply control in the third embodiment will be described with reference to a flowchart illustrated in FIG. 8. Step S1 to step S3 and step S7 in the flowchart illustrated in FIG. 8 are common to the flowchart illustrated in FIG. 4, that is, the oil supply control in the first embodiment. Therefore, description of steps S1 to S3 and step S7 is omitted.

In the oil supply control according to the third embodiment, the application voltage limitation unit 70*d* limits the motor application voltage in step S31. The limitation of the motor application voltage is executed based on a map illustrated in FIG. 9. The map illustrated in FIG. 9 is a map for setting the output torque. The output torque is expressed as a ratio to the full load torque of the first motor generator 130. The output torque may be referred to as a load factor of the first motor generator 130. The limit value of the output torque is set by a combination of the coil temperature in the first motor generator 130 and the altitude of the vehicle 220 mapped on the map. The higher the altitude at which the vehicle 220 is located and the higher the coil temperature, the greater the limitation of the output torque. The application voltage limitation unit 70*d* limits the application voltage of the first motor generator 130 based on a set limit value of the output torque. The first motor generator 130 is driven by the limited voltage to start the engine 122.

The ECU 70 drives the first motor generator 130 to start the engine 122 in Step S31 which is executed subsequent to Step S41. When the engine 122 is started, the oil pump 164 is driven. Thus, the supply of oil to the first motor generator 130 is started.

In step S51, the ECU 70 determines whether or not the oil supply amount capable of avoiding dielectric breakdown is satisfied. The oil supply amount can be determined based on, for example, a combination of the rotation speed of the engine 122 and the operation time of the engine 122. If the rotation speed of the engine 122 is high, a predetermined oil supply amount can be reached even if the operation time is short. On the other hand, when the rotation speed of the engine 122 is low, the operation time to reach the required oil supply amount is long. When a negative determination is made in step S51, the ECU 70 repeats the process of step S51 until an affirmative determination is made in step S51.

On the other hand, when an affirmative determination is made in step S51, the ECU 70 proceeds to step S61.

In step S61, the ECU 70 releases the limitation of the voltage applied to the first motor generator 130. Thus, the first motor generator 130 drives the vehicle 220 without being limited by the application voltage.

The ECU 70 proceeds to step S7 subsequence to step S61.

According to the third embodiment, the insulation resistance of the first motor generator 130 and the second motor generator 230 is improved as in the second embodiment. Further, by limiting the application voltage when starting the engine 122, it is possible to more reliably avoid dielectric breakdown.

Fourth Embodiment

Figure 10:
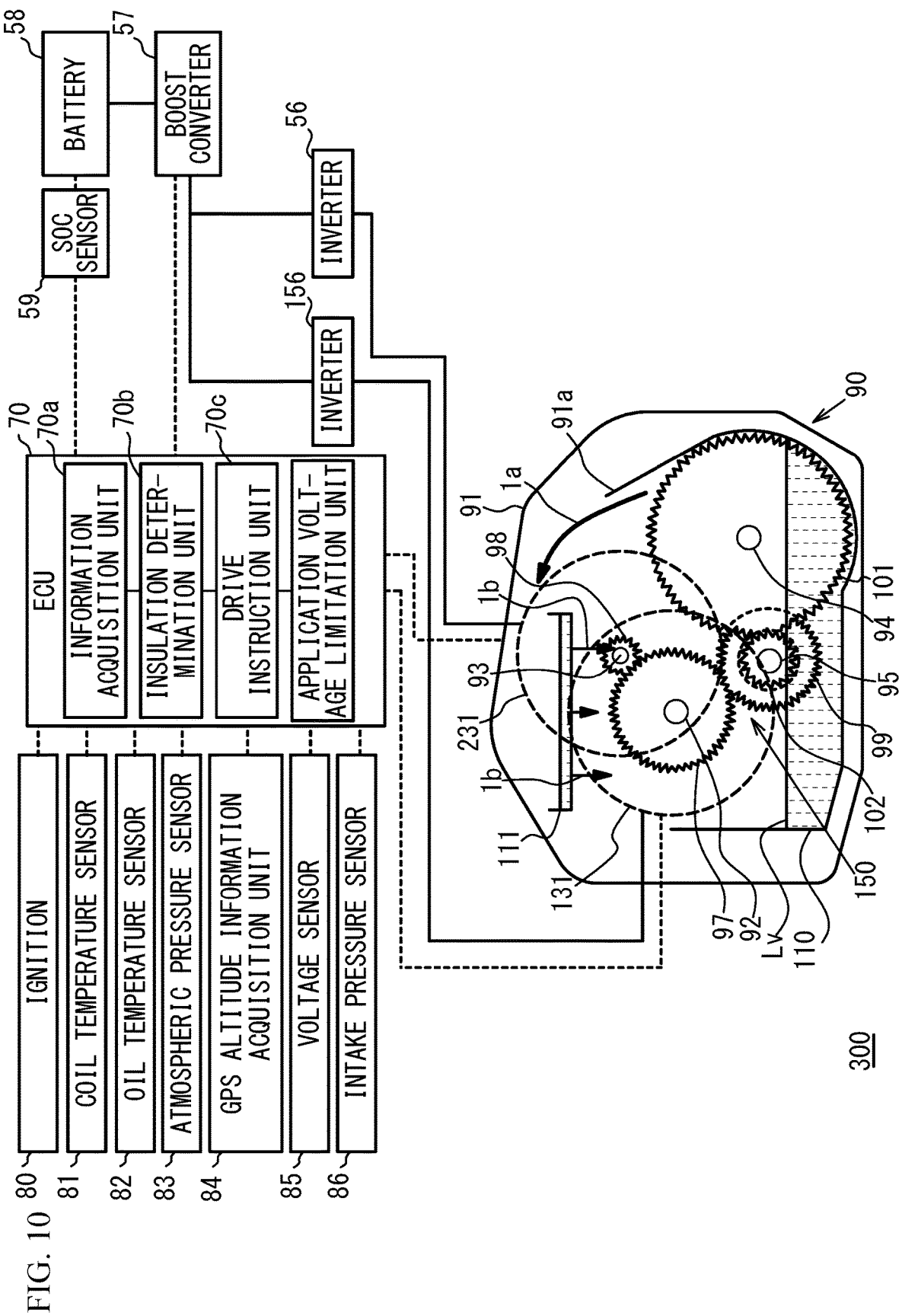
FIG. 10 is an explanatory view illustrating an outline of a rotary electric machine unit according to a fourth embodiment.

Next, a fourth embodiment will be described with reference to FIGS. 10 and 11. A rotary electric machine unit 300 according to the fourth embodiment includes a MG1 and a MG2, that is, a first motor generator 131 and a second motor generator 231. The first motor generator 131 and the second motor generator 231 form a driving device 90 together with a gear mechanism 150. The first motor generator 131, the second motor generator 231, and the gear mechanism 150 are provided in a case 91. The rotary electric machine unit 300 includes components common to those of the third embodiment. Common components are provided with the same reference numerals as in the third embodiment. A detailed description of components common to the third embodiment is omitted. Hereinafter, a configuration of the driving device 90 will be described, and an example of oil supply control in the rotary electric machine unit 300 will be described.

The driving device 90 includes the case 91. An input shaft 92, an MG shaft 93, a differential shaft 94, and a counter shaft 95 are disposed inside the case 91. The input shaft 92 is coaxially coupled to an output shaft of the engine (not illustrated in the fourth embodiment). The first motor generator 131 disposed coaxially with the input shaft 92 and the second motor generator 231 disposed coaxially with the MG shaft 93 are provided in the case 91.

The MG shaft 93 is an input/output shaft of the second motor generator 231. Torque is transmitted between the input shaft 92 and the MG shaft 93 via a gear 97 of the input shaft 92 and a gear 98 of the MG shaft 93. The rotation of the input shaft 92 is transmitted from the gear 97 of the input shaft 92 to a gear 99 of the counter shaft 95, and is further transmitted from a gear 102 of the counter shaft 95 to a differential ring gear (rotary member) 101 of the differential shaft 94. The rotation of the differential shaft 94 is transmitted to driving wheels of the vehicle via a differential device (not illustrated).

In the driving device 90, the oil scooped up by the differential ring gear 101 is supplied to each part of the driving device 90. Accordingly, lubrication and cooling of each part of the driving device 90 are executed. In addition, dielectric breakdown in the first motor generator 131 and the second motor generator 231 is avoided.

An oil reservoir 110 is provided in a lower portion of the case 91. An oil catch tank 111 is formed in an upper portion of the case 91. The oil catch tank 111 is provided above the differential ring gear 101. The differential ring gear 101 is provided such that a lower portion thereof is positioned below a liquid level Lv of the oil stored in the oil reservoir 110. When the differential ring gear 101 rotates in conjunction with the traveling (forward movement) of the vehicle, the oil in the oil reservoir 110 is scooped up by the differential ring gear 101. As a result, the oil is sent to the oil catch tank 111 as indicated by an arrow 1a.

The oil sent to the oil catch tank 111 drips from the oil catch tank 111 toward the first motor generator 131 and second motor generator 231 as indicated by an arrow 1b.

Thus, dielectric breakdown in the first motor generator 131 and the second motor generator 231 is avoided.

In the present embodiment, the first motor generator 131 and the second motor generator 231 are provided. However, the drive device may be a so-called one motor type in which only one motor generator is provided. In the present embodiment, the engine is not essential, and the vehicle may be an electric vehicle.

Here, an example of the oil supply control in the fourth embodiment will be described with reference to a flowchart illustrated in FIG. 11. Step S1 to step S3 and step S7 in the flowchart illustrated in FIG. 11 are common to the flowchart illustrated in FIG. 4, that is, the oil supply control in the first embodiment. Therefore, description of steps S1 to S3 and step S7 is omitted.

Figure 8:
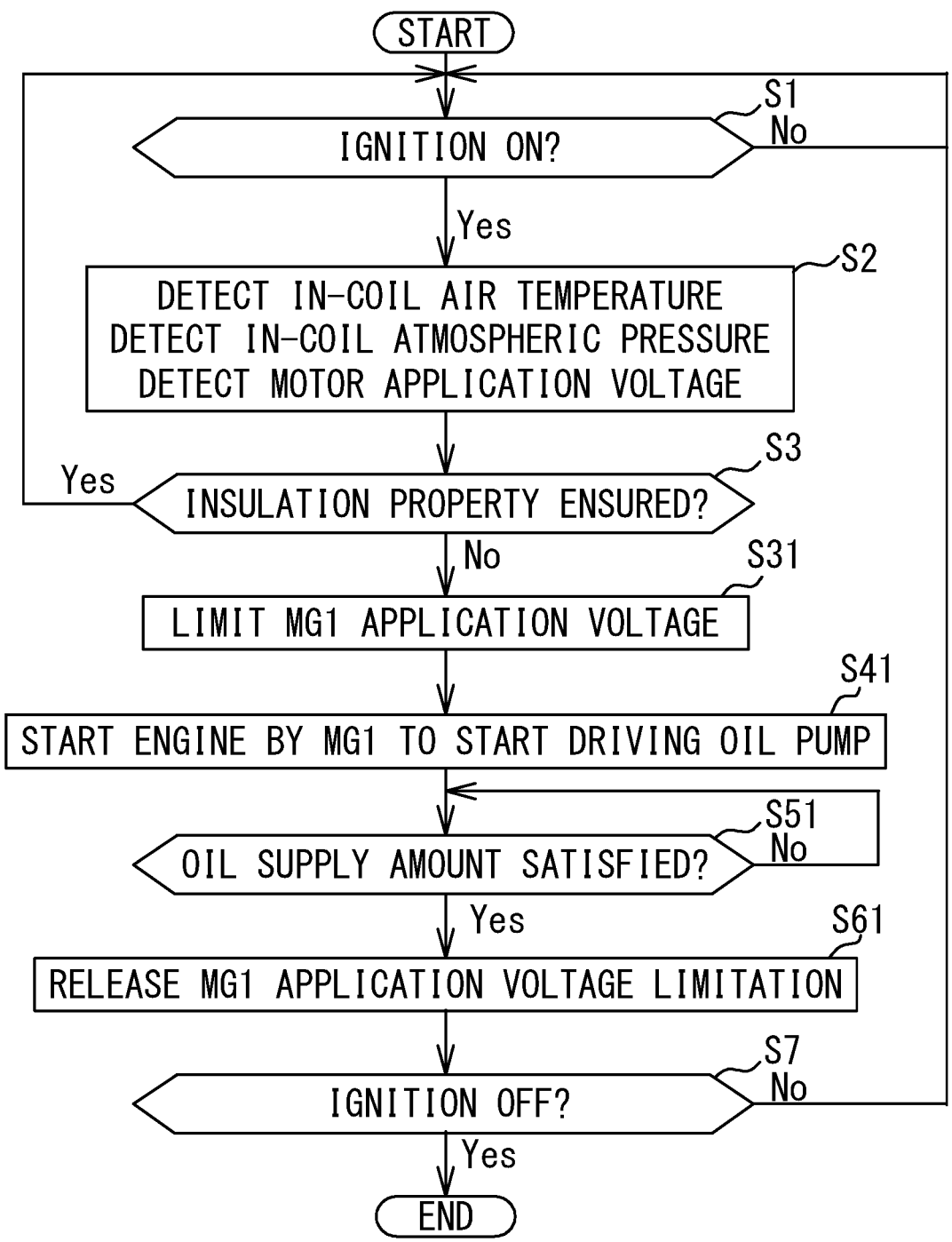
FIG. 8 is a flowchart illustrating an example of control executed by the control device for the rotary electric machine unit according to the third embodiment.
Figure 9:
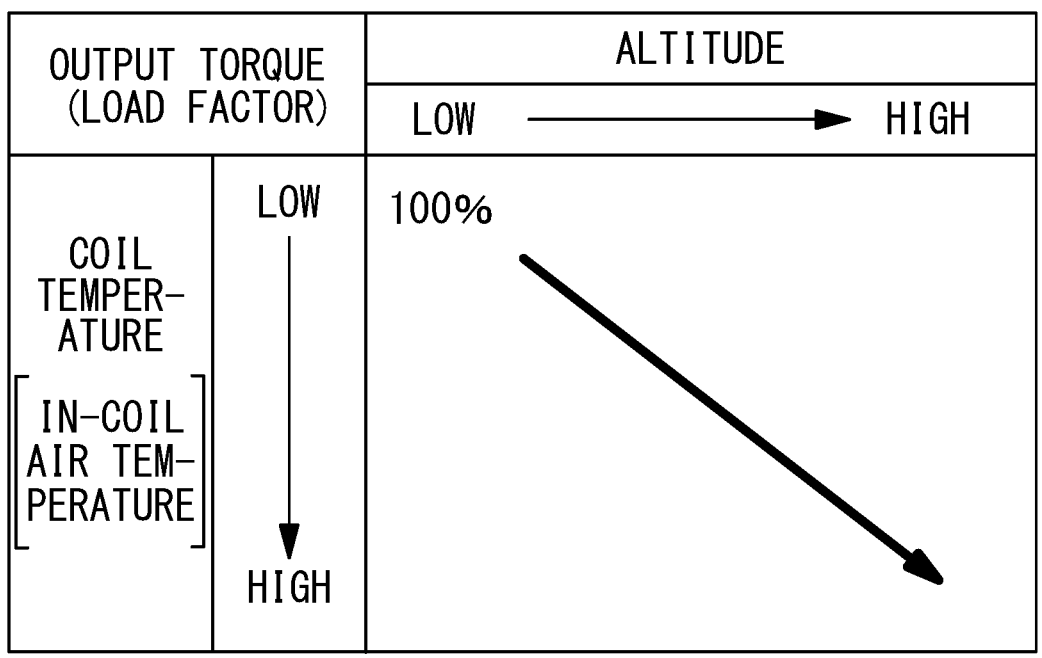
FIG. 9 is an example of a map for setting an output torque of a first motor generator in the third embodiment.
Figure 11:
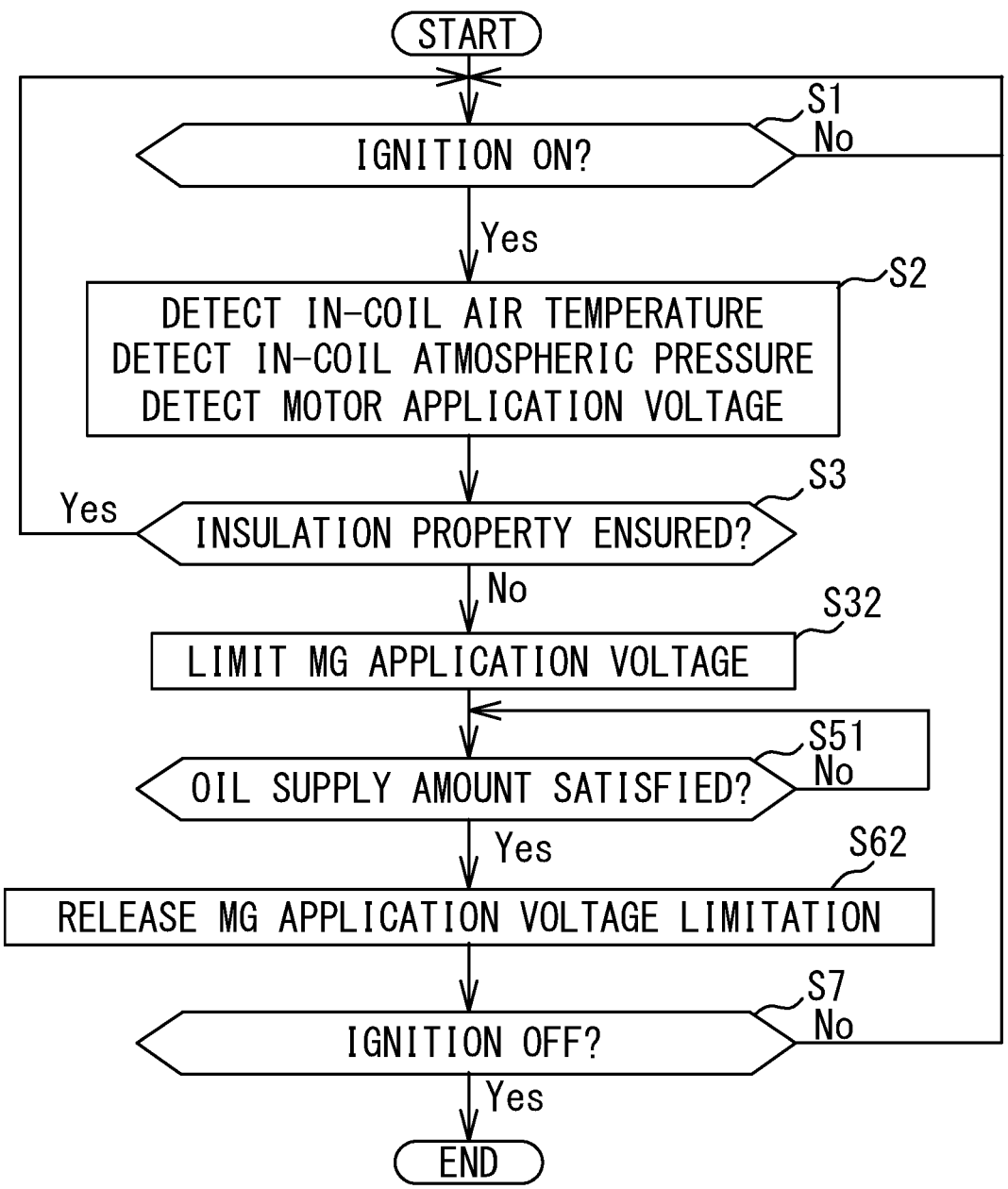
FIG. 11 is a flowchart illustrating an example of control executed by a control device for the rotary electric machine unit according to the fourth embodiment.

When the flowchart according to the present embodiment illustrated in FIG. 11 is compared with the flowchart according to the third embodiment illustrated in FIG. 8, step S31 and step S61 are executed in the present embodiment in place of step S32 and step S62 in the third embodiment. This is because both the first motor generator 130 and the second motor generator 231 are subjected to the application voltage limitation in the present embodiment, whereas only the first motor generator 131 is subjected to the application voltage limitation in the third embodiment. The level of the application voltage in step S32 is set in the same manner as in step S31, and thus a detailed description thereof is omitted here.

In the present embodiment, the process corresponding to step S41 in the third embodiment is not set. In addition, the present embodiment and the third embodiment are common in that it is determined whether or not the oil supply amount is satisfied in step S51. However, in the present embodiment, the determination whether or not the oil supply amount is sufficient is made based on a combination of the vehicle speed and the duration thereof.

The oil supply in the fourth embodiment is carried out by scooping up with gears. For this reason, it is not essential for the system to include an oil pump, and there is no problem of electricity consumption or driving loss due to driving of the oil pump. However, even in a system that does not include an oil pump, it is possible to avoid occurrence of dielectric breakdown when the rotary electric machine is driven by limiting the application voltage as in the present embodiment.

Although some embodiments of the present disclosure have been described in detail, the present disclosure is not limited to the specific embodiments but may be varied or changed within the scope of the present disclosure as claimed.

What is claimed is:

1. A control device for a rotary electric machine unit including: a rotary electric machine; and an oil supply unit including an oil pump that supplies oil to a coil included in the rotary electric machine, the control device comprising:
    an information acquisition unit configured to acquire information related to an air density in the coil and information related to a voltage applied to the rotary electric machine;
    an insulation determination unit configured to determine whether or not dielectric breakdown occurs in the coil based on the information related to the air density and the information related to the voltage acquired by the information acquisition unit, and configured to determine whether or not an insulation state of the coil is needed to be maintained by supplying the oil to the coil; and
    a drive instruction unit configured to drive the oil supply unit, when the insulation determination unit determines that dielectric breakdown occurs in the coil and determines that the insulation state of the coil is needed to be maintained by supplying the oil to the coil.

2. The control device for the rotary electric machine unit according to claim 1, wherein the information acquisition unit is configured to acquire information related to an air temperature in the coil and information related to an atmospheric pressure, as the information related to the air density.

3. The control device for the rotary electric machine unit according to claim 2, wherein the information acquisition unit is configured to acquire a detection value of a temperature of the coil or a detection value of a temperature of the oil, as the information related to the air temperature in the coil.

4. The control device for the rotary electric machine unit according to claim 2, wherein the information acquisition unit is configured to acquire a detection value of an atmospheric pressure sensor or altitude information acquired by a position information acquisition device included in a vehicle on which the rotary electric machine is mounted, as the information related to the atmospheric pressure.

5. The control device for the rotary electric machine unit according to claim 1,
    wherein
    the oil pump is a mechanical pump that is driven by operation of an internal combustion engine,
    the drive instruction unit is configured to drive the rotary electric machine to start the internal combustion engine, when the insulation determination unit determines that dielectric breakdown occurs in the coil and determines that the insulation state of the coil is needed to be maintained by supplying the oil to the coil,
    the control device further includes an application voltage limitation unit, and
    the application voltage limitation unit is configured to limit the voltage applied to the rotary electric machine, when the rotary electric machine is driven to start the internal combustion engine in accordance with an instruction from the drive instruction unit.

6. A control device for a rotary electric machine unit including: a rotary electric machine; and an oil supply unit including a gear mechanism that is driven by the rotary electric machine, at least a part of the gear mechanism being immersed in oil, the oil supply unit supplying the oil to a coil included in the rotary electric machine by operating the gear mechanism, the control device comprising:
    an information acquisition unit configured to acquire information related to an air density in the coil and information related to a voltage applied to the rotary electric machine;
    an insulation determination unit configured to determine whether or not dielectric breakdown occurs in the coil based on the information related to the air density and the information related to the voltage acquired by the information acquisition unit, and configured to determine whether or not an insulation state of the coil is needed to be maintained by supplying the oil to the coil;
    a drive instruction unit configured to drive the oil supply unit, when the insulation determination unit determines that dielectric breakdown occurs in the coil and determines that the insulation state of the coil is needed to be maintained by supplying the oil to the coil; and an application voltage limitation unit configured to limit the voltage applied to the rotary electric machine, when the rotary electric machine is driven in accordance with an instruction from the drive instruction unit.

\* \* \* \* \*